(12) United States Patent
Comley et al.

(10) Patent No.: US 7,533,794 B2
(45) Date of Patent: May 19, 2009

(54) SUPERPLASTIC FORMING AND DIFFUSION BONDING OF FINE GRAIN TITANIUM

(75) Inventors: Peter N. Comley, Sumner, WA (US); Larry D. Hefti, Auburn, WA (US)

(73) Assignee: The Boring Company, Chicago, IL (US)

( * ) Notice: Subject to any disclaimer, the term of this patent is extended or adjusted under 35 U.S.C. 154(b) by 170 days.

(21) Appl. No.: 10/813,892

(22) Filed: Mar. 31, 2004

(65) Prior Publication Data
US 2005/0218193 A1    Oct. 6, 2005

(51) Int. Cl.
B23K 31/00    (2006.01)
B23K 20/00    (2006.01)

(52) U.S. Cl. .................. 228/157; 228/193

(58) Field of Classification Search ............... 228/157, 228/193
See application file for complete search history.

(56) References Cited

U.S. PATENT DOCUMENTS

| | | | |
|---|---|---|---|
| 3,713,207 A * | 1/1973 | Ruckle et al. ............. | 228/235.1 |
| 3,927,817 A | 12/1975 | Hamilton et al. | |
| 4,331,284 A * | 5/1982 | Schulz et al. ............... | 228/157 |
| 4,361,262 A * | 11/1982 | Israeli ......................... | 228/118 |
| 4,406,393 A * | 9/1983 | Ascani et al. ............... | 228/157 |
| 4,526,312 A * | 7/1985 | Goss et al. .................. | 228/157 |
| 4,658,362 A | 4/1987 | Bhatt | |
| 4,712,750 A | 12/1987 | Ridgwell | |
| 4,820,355 A * | 4/1989 | Bampton ..................... | 148/535 |
| 4,846,393 A * | 7/1989 | Devillard .................... | 228/178 |
| 4,882,823 A * | 11/1989 | Weisert et al. ............... | 29/6.1 |
| 4,982,893 A * | 1/1991 | Ruckle et al. ............... | 228/220 |
| 5,024,369 A | 6/1991 | Froes et al. | |
| 5,118,026 A * | 6/1992 | Stacher ........................ | 228/157 |
| 5,124,121 A | 6/1992 | Ogawa et al. | |
| 5,214,948 A * | 6/1993 | Sanders et al. .................. | 72/58 |

(Continued)

FOREIGN PATENT DOCUMENTS

EP    0 507 067    10/1992

(Continued)

OTHER PUBLICATIONS

G.A. Salishchev, O.R. Valiakhmetov, R.M. Galeyev, and F.H. Froes, "Characterization of Submicron-Grained Ti-6Al-4V Sheets with Enhanced Superplastic Properties", Superplasticity in Advanced Materials-ICSAM 2003, Materials Science Forum vols. 447-448 (2004), pp. 441-446, Trans Tech Publications, Switzerland.*

(Continued)

*Primary Examiner*—Kevin P Kerns
(74) *Attorney, Agent, or Firm*—Alston & Bird LLP (57) ABSTRACT

A method for superplastically forming and/or diffusion bonding a structural member and an associated structural member are provided. The structural member is formed at least partially of titanium, e.g., Ti-6Al-4V, and has a fine grain structure. For example, the grain size of the material of the structural member can be less than 2 micron. The member can be superplastically formed and/or diffusion bonded at a reduced temperature, thereby potentially reducing the thermal energy required for forming and bonding, and also reducing the effects of heating on the structural member and the forming apparatus. In addition, the structural member can be formed at an increased strain rate.

25 Claims, 7 Drawing Sheets

U.S. PATENT DOCUMENTS

| | | | |
|---|---|---|---|
| 5,330,092 | A | 7/1994 | Gregg et al. |
| 5,460,317 | A | 10/1995 | Thomas et al. |
| 5,683,607 | A * | 11/1997 | Gillespie et al. ............ 219/633 |
| 5,715,644 | A | 2/1998 | Yasui |
| 6,612,020 | B2 | 9/2003 | Sanders |
| 2002/0079351 | A1 | 6/2002 | Mishra et al. |
| 2003/0192939 | A1 | 10/2003 | Mishra |
| 2003/0201366 | A1 | 10/2003 | Connelly et al. |
| 2005/0133567 | A1 | 6/2005 | Runyan |
| 2007/0102494 | A1 * | 5/2007 | Connelly et al. ............ 228/157 |

FOREIGN PATENT DOCUMENTS

| | | |
|---|---|---|
| WO | WO 95/13406 A1 * | 5/1995 |
| WO | WO 9513406 A1 * | 5/1995 |

OTHER PUBLICATIONS

Superplasticity in Advanced Materials—ICSAM 2003; pp. 1-2; printed Jan. 8, 2004; http://www.ttp.net/0-87849-937-7/441.htm.

Superplasticity in Advanced Materials—ICSAM 2003; pp. 1-2; printed Jan. 8, 2004; http://www.ttp.net/0-87849-937-7/239.htm.

ICSAM 2003; Tuesday Schedule.

Justin, Bellamy, et al., Retaining Wall Improvement and Redesign-BR 703.

Superplastic Formability Of SP-700; p. 1; printed Jan. 8, 2004; http://www.rti-intl.com/tag/superf.htm.

VSMPO; pp. 1-2; printed Jan. 8, 2004; http://www.maks.ru/expo/798/anketa.htm.

Materials and Structures Technology Newsletter; vol. 1, Issue 2, McDonnell Douglas Aerospace, May 1996; pp. 1-4; printed Jan. 8, 2004; https://ams2.web.boeing.com/mast/newsletter/9605.html.

Applying Superplastic Forming Principles to Titanium Sheet Metal Forming Problems; p. 1; printed Jan. 8, 2004; http://www.titanium.org/confernces/2003/SPEAKERS.htm.

Low Temperature SPF; p. 1; printed Jan. 8, 2004; http://www.ttp.net/Low_Temperature_SPF.htm.

Diffusion Bonding and Superplastic Behaviour of Titanium Alloys; Abstract of Report on EPSRC ROPA Research Grant K36928; Dr. Norman Ridley; pp. 1-2; printed Jan. 8, 2004; http://www2.umist.ac.uk/material/epsrc/k36928.htm.

Superplasticity in Advanced Materials—ICSAM 2003; pp. 1-2; printed Jan. 8, 2004; http://www.ttp.net/0-87849-937-7/233.htm.

H. Van Swygenhoven, "Plastic Deformation in Metals with Nanosized Grains: Atomistic Simulations and Experiments," Superplasticity in Advanced Materials-ICSAM 2003, Materials Science Forum vols. 447-448, 2004, pp. 3-10, Trans Tech Publications, Switzerland.

H. Muto, Y. Takahashi and M. Sakai, "Grain-Size-Dependent Cooperative Grain-Boundary Sliding in Superplastic Deformation," Superplasticity in Advanced Materials-ICSAM 2003, Materials Science Forum vols. 447-448, 2004, pp. 97-102, Trans Tech Publications, Switzerland.

Werner Beck, "Results of In-House Cone-Cup Testing of Low to High Temperature SPF-Alloys," Superplasticity in Advanced Materials-ICSAM 2003, Materials Science Forum vols. 447-448, 2004, pp. 145-152, Trans Tech Publications, Switzerland.

M.T. Perez-Prado, J.A. Del Valle and O.A. Ruano, "Superplastic Behavior of a Fine Grained AZ61 Alloy Processed by Large Strain Hot Rolling," Superplasticity in Advanced Materials-ICSAM 2003, Materials Science Forum vols. 447-448, 2004, pp. 221-226, Trans Tech Publications, Switzerland.

Peter N. Comley, "Lowering the Heat—The Development of Reduced SPF Temperature Titanium Alloys for Aircraft Production," Superplasticity in Advanced Materials-ICSAM 2003, Materials Science Forum vols. 447-448, 2004, pp. 233-238, Trans Tech Publications, Switzerland.

N. Miyano, H. Iwasa, K. Isonishi, S. Tanaka, S. Sugiyama and K. Ameyama, "Application of Psuedo-Superplasticity to Produce TiN/$Ti_5Si_3$ and $TiC/Ti_5Si_3$ Nano Grain Composites for Micro Molding," Superplasticity in Advanced Materials-ICSAM 2003, Materials Science Forum vols. 447-448, 2004, pp. 311-316, Trans Tech Publications, Switzerland.

Cheng Xu, Minoru Furukawa, Zenji Horita and Terence G. Langdon, "Producing Superplastic Ultrafine-Grained Aluminum Alloys through Severe Plastic Deformation," Superplasticity in Advanced Materials-ICSAM 2003, Materials Science Forum vols. 447-448, 2004, pp. 403-410, Trans Tech Publications, Switzerland.

R.Z. Valiev, R.K. Islamgaliev and N.F. Yunusova, "Microstructural Aspects in Superplasticity of Ultrafine-Grained SPD Alloys," Superplasticity in Advanced Materials-ICSAM 2003, Materials Science Forum vols. 447-448, 2004, pp. 411-416, Trans Tech Publications, Switzerland.

F. Musin, R. Kaibyshev, Y. Motohashi and G. Itoh, "Superplastic Behaviour and Microstructure Evolution in a Commercial Ultra-Fine Grained Al-Mg-Sc Alloy," Superplasticity in Advanced Materials-ICSAM 2003, Materials Science Forum vols. 447-448, 2004, pp. 417-422, Trans Tech Publications, Switzerland.

P.J. Apps, C.P. Heason and P.B. Prangnell, "Ultrafine-Grain Structures Produced by Severe Deformation Processing," Superplasticity in Advanced Materials-ICSAM 2003, Materials Science Forum vols. 447-448, 2004, pp. 423-428, Trans Tech Publications, Switzerland.

G.A. Salishchev, O.R. Valiakhmetov, R.M. Galeyev and F.H. Froes, "Characterization of Submircon-Grained Ti-6Al-4V Sheets with Enhanced Superplastic Properties," Superplasticity in Advanced Materials-ICSAM 2003, Materials Science Forum vols. 447-448, 2004, pp. 441-446, Trans Tech Publications, Switzerland.

G.A. Salishchev, S.V. Zherebtsov, O.R. Valiakhmetov, R.M. Galeyev and S.Yu. Mironov, "Development of Submicrocrystalline Titanium Alloys Using "abc" Isothermal Forging," Superplasticity in Advanced Materials-ICSAM 2003, Materials Science Forum vols. 447-448, 2004, pp. 459-464, Trans Tech Publications, Switzerland.

F. Musin, R. Kaibyshev, Y. Motohashi and G. Itoh, "Achievement of Low Temperature Superplasticity in a Commercial Aluminum Alloy Processed by Equal-Channel Angular Extrusion," Superplasticity in Advanced Materials-ICSAM 2003, Materials Science Forum vols. 447-448, 2004, pp. 465-470, Trans Tech Publications, Switzerland.

Koichi Makii, Seiya Furuta, Kazuo Aoki, Atsumichi Kushibe, Tsutomu Tanaka and Kenji Higashi, "A Nano-Crystalline Zn-Al Alloy with High Speed Superplasticity at Room Temperature and the Application for Seismic Damper," Superplasticity in Advanced Materials-ICSAM 2003, Materials Science Forum vols. 447-448, 2004, pp. 497-504, Trans Tech Publications, Switzerland.

Murray Mahoney, A.J. Barnes, W.H. Bingle and C. Fuller, "Superplastic Forming of 7475 Al Sheet after Friction Stir Processing (FSP)," Superplasticity in Advanced Materials-ICSAM 2003, Materials Science Forum vols. 447-448, 2004, pp. 505-512, Trans Tech Publications, Switzerland.

Tsutomu et al.. Microstructure and Superplastic Properties at Room Temperature in ZN-22Al Alloy after Equal-Channel-Angular Extrusion; *Materials Science Forum*, vols. 447-448, (2004) pp. 489-494.

U.S. Appl. No. 10/970,151, filed Oct. 21, 2004, Sanders, et al.

Search Report and Written Opinion for PCT/US2006/043671 dated Apr. 18, 2007.

* cited by examiner

SUPERPLASTIC FORMING AND DIFFUSION BONDING OF FINE GRAIN TITANIUM

BACKGROUND OF THE INVENTION

1) Field of the Invention

The present invention relates to the forming and bonding of structural members and, more particularly, relates to the use of fine grain titanium for superplastic forming and diffusion bonding.

2) Description of Related Art

Superplastic forming (SPF) generally refers to a process in which a material is superplastically deformed beyond its normal limits of plastic deformation. Superplastic forming can be performed with certain materials that exhibit superplastic properties within limited ranges of temperature and strain rate. For example, workpieces formed of titanium alloys are typically superplastically formed in a temperature range between about 1450° F. and 1850° F. at a strain rate up to about $3 \times 10^{-4}$ per second.

Diffusion bonding (DB) generally refers to a process of joining members using heat and pressure to form a solid-state coalescence between the materials of the joined members. Joining by diffusion bonding occurs at a temperature below the melting point of the materials that are being joined, and the coalescence therebetween is produced with loads below those that would cause macroscopic deformation of the article.

According to one conventional process, superplastic forming is performed by providing one or more superplastically formable metal sheets in a die cavity defined between cooperable dies, heating the sheets to an elevated temperature at which the sheets exhibit superplasticity, and then using a gas to apply differential pressures to the opposite sides of the sheets in order to form the sheets. The pressure is selected to strain the material at a strain rate that is within its superplasticity range at the elevated temperature, stretch the sheet, and cause it to assume the shape of the die surface. In this way, the sheet can be formed to a complex shape defined by the dies. Further, in some cases, superplastic forming and diffusion bonding are performed in a combined forming/bonding operation. For example, in one typical combined SPF/DB process, three metal sheets are stacked to form a pack. A stop-off material is selectively provided between the sheets to prevent portions of the adjacent surfaces of the sheets from being bonded. The pack is heated and compressed in a die cavity with sufficient gas pressure so that the adjacent portions of the sheets that are not treated with the stop-off material are joined by diffusion bonding. Thereafter, a pressurized gas is injected between the sheets to inflate the pack, and thereby superplastically form the pack to a configuration defined by the surface of the die cavity. This process is described further in U.S. Pat. No. 3,927,817 to Hamilton, et al. Such a combined SPF/DB process can be used, e.g., to produce complex honeycomb sandwich structures that are formed and diffusion bonded to define hollow internal cells. Generally, the simplicity of the superplastic forming and/or diffusion bonding processes can result in lighter and less expensive structures with fewer fasteners and higher potential geometric complexity. Applications of SPF and/or DB include the manufacturing of parts for aircraft, other aerospace structures, non-aerospace vehicles and structures, and the like.

Titanium alloys are often used for superplastic forming with or without diffusion bonding and, in particular, Ti-6Al-4V (or "Ti 6-4"), which includes approximately 6% by weight aluminum, 4% by weight vanadium, and the remainder titanium. Ti-6Al-4V is conventionally superplastically formed and diffusion bonded at a temperature of about 1650° F. This relatively high forming and bonding temperature thermally stresses the dies or other tooling used during the operation. In addition, the operation of the dies at such temperatures can result in pitting or other degradation of the dies. If the surfaces of the dies that contact the sheet are pitted or otherwise damaged, the contour imparted to the sheets during the SPF/DB operation can be correspondingly nonuniform. Thus, in some cases, the dies must be regularly cleaned and dressed to maintain a particular surface finish, and such dies typically must be replaced periodically. In addition, higher forming/bonding temperatures generally put more demand on the heater that is used for heating the part to the forming/bonding temperature, and the higher temperatures also require more energy.

Conventional Ti-6Al-4V is generally not superplastically formed or diffusion bonded at temperatures below about 1650° F. At lower temperatures, a greater forming stress is required for forming the material. For example, at 1650° F., a conventional sheet of Ti-6Al-4V can be superplastically formed to twice its original length at a strain rate of $3 \times 10^{-4}$ per second and at a true stress of less than about 5000 psi. At a temperature of about 1425° F., a similar piece of material would typically be subjected to about a 100% higher stress to achieve the same strain rate.

It has further been observed that one typical operation for superplastic forming and/or diffusion bonding of Ti-6Al-4V results in the formation of a layer of brittle alpha case oxide material on the surfaces of the titanium sheet, typically about 0.002 inch thick on each surface of the sheet. The alpha case oxide layer is normally removed from the sheet by chemical milling, i.e., exposing the sheet to an acidic liquid that dissolves the 0.003-inch thick layer of the material in about 4 minutes. As a result, a sheet having a thickness greater than the desired thickness of the finished product must typically be used to allow for the oxidation and subsequent removal of material. Also, the chemical milling operation typically does not affect the sheet uniformly, and therefore some portions of the sheet may be milled beyond the desired amount before other portions are sufficiently milled.

While the conventional methods for SPF/DB processing have proven effective for manufacturing a variety of structural parts, including parts formed of titanium, there exists a continued need for improved SPF/DB methods and parts. The methods should reduce the wear on the dies or other tooling and the required maintenance therefor. Also, the methods should reduce the required energy for SPF/DB operations and the oxidation of material during processing.

BRIEF SUMMARY OF THE INVENTION

The present invention provides a method for forming and/or joining one or more structural members by SPF/DB and an associated structural member formed thereby. The structural member, which has a refined grain size, can be superplastically formed and/or diffusion bonded at a reduced temperature, thereby requiring less heating and reducing the effects of heating on the structural member and the forming apparatus.

According to one method of the present invention, a blank comprising titanium and having a grain size of less than about 2 micron is provided. For example, the blank can be formed of Ti-6Al-4V and can have a grain size of between about 0.8 and 1.2 micron or, more particularly, about 1 micron. The blank is heated and superplastically formed and/or diffusion bonded at a temperature less than about 1500° F. to produce the structural member having the predetermined configuration, generally while placing less thermal stress on the dies or other tooling and requiring less energy relative to conventional SPF/DB processes that operate at higher temperatures. For example, the structural member can be superplastically formed and/or diffusion bonded at a temperature between about 1400° F. and 1450° F., such as about 1425° F. According to one aspect of the present invention, the blank is formed at a relatively high strain rate such as at least about $6 \times 10^{-4}$ per second or at least about $1 \times 10^{-3}$ per second. According to another aspect of the invention, an alpha case layer of less than about 0.001 inch is formed on each surface of the structural member during the forming and/or bonding process. The alpha case can be removed by pickling the structural member, e.g., by subjecting the structural member to a pickling fluid and thereby removing material from surfaces of the structural member at a rate less than about $5 \times 10^{-5}$ inch per minute. In some cases, less than about 0.001 inch is removed from each surface of the structural member, and the blank can have a thickness that is less than about 0.002 inch greater than a desired thickness of the structural member.

The present invention also provides a superplastically formed and/or diffusion bonded structural member having a desired configuration and being formed of titanium with a grain size of less than about 2 micron throughout. For example, the structural member can be formed of Ti-6Al-4V and can have a grain size of between about 0.8 and 1.2 micron, such as about 1 micron. The surfaces of the structural member can be substantially devoid of alpha case oxide.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout.

Figure 1:
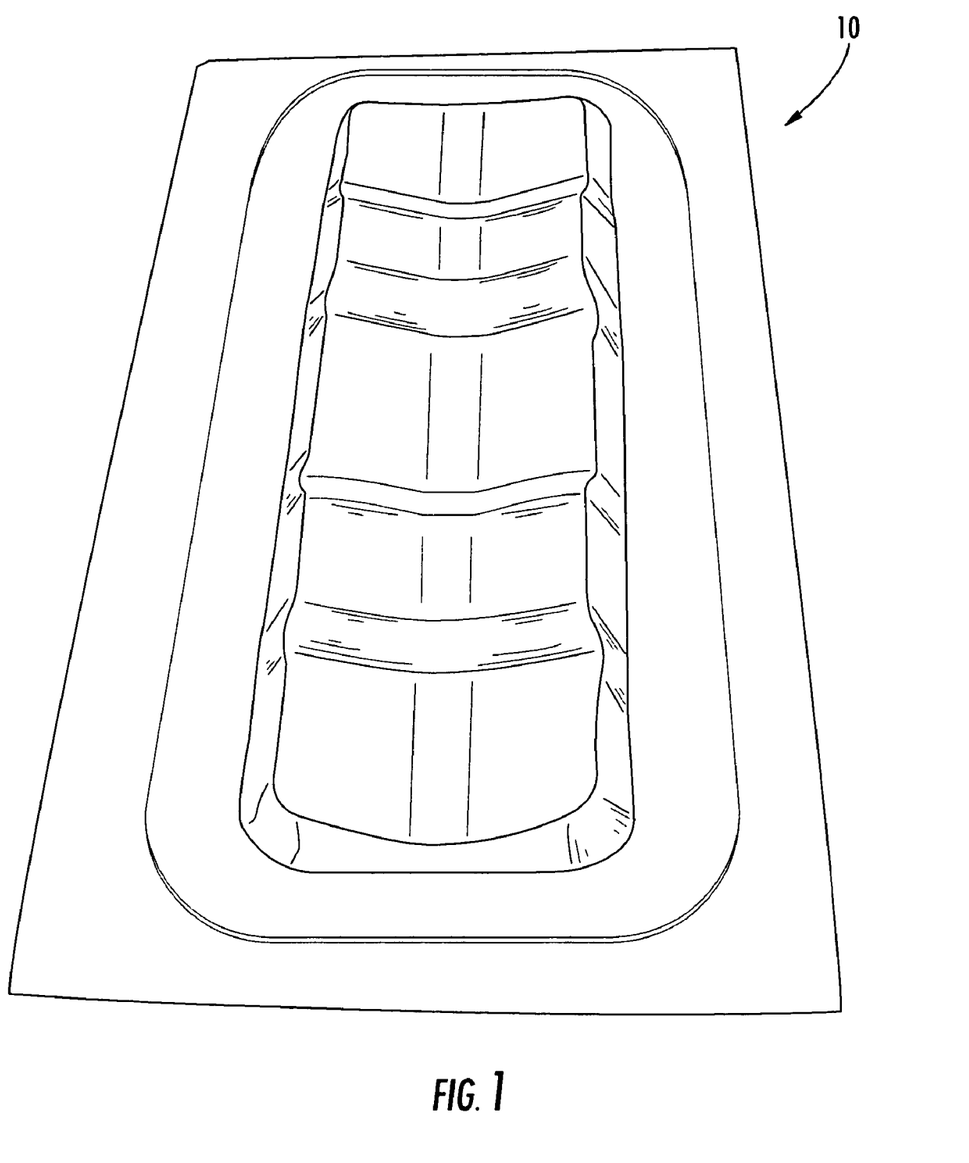
FIG. 1 is a perspective view illustrating a superplastically formed structural member according to one embodiment of the present invention.
Figure 2A:
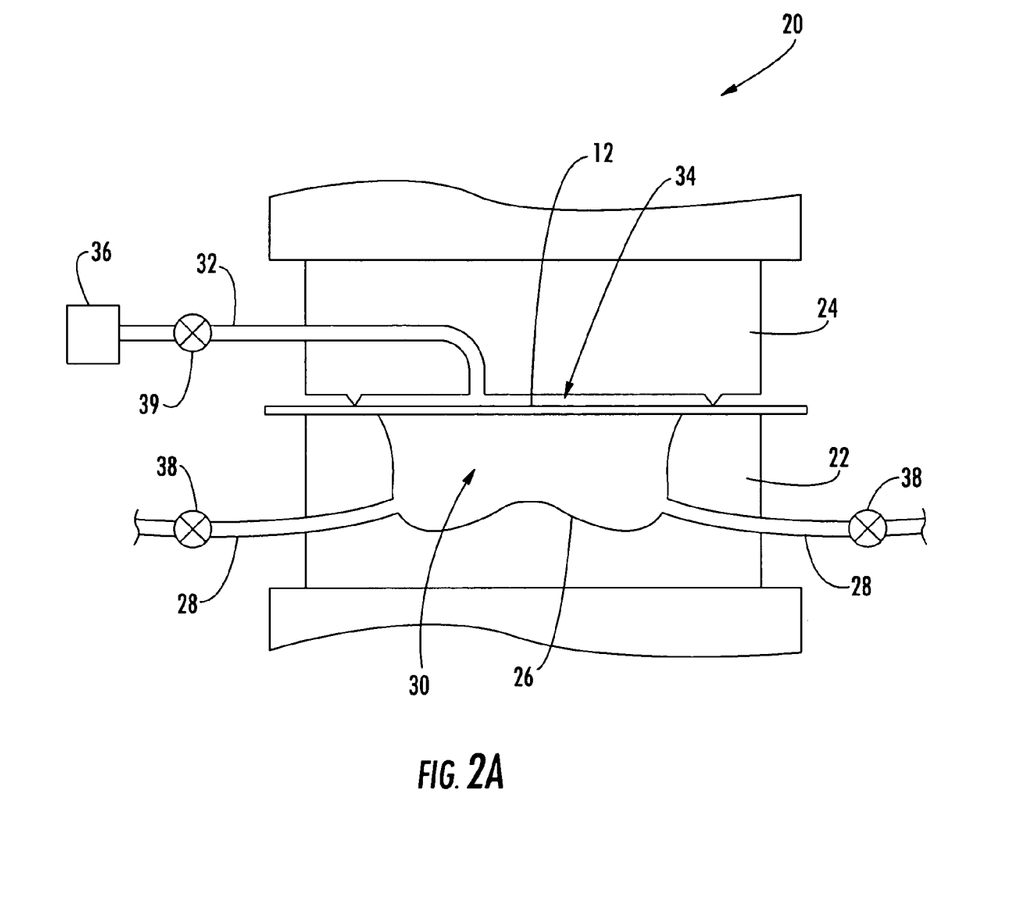
FIG. 2A is a section view in elevation illustrating a blank disposed in a forming apparatus for forming a structural member such as the one illustrated in FIG. 1.

Referring now to the figures and in particular to FIG. 1, there is shown a superplastically formed structural member 10 according to one embodiment of the present invention. The structural member 10 can be formed from and to various configurations. For example, the structural member 10 can be formed from a blank 12 (FIG. 2), such as a laminar sheet of material, that is superplastically formed to a desired nonplanar configuration defining a simple or complex geometry. In other embodiments of the present invention, the blank 12 used to manufacture the structural member 10 can be another stock or non-stock configuration such as a plate, bar, channel, angle, and the like. Further, the structural member 10 can include multiple members that are joined before, during, or after the forming process. In any case, the structural member 10 can be used in a variety of applications, for example, as a member of an aircraft wing, aircraft fuselage, other aeronautical vehicle, or the like. The structural member 10 can also be formed for and used in a wide variety of other applications including, without limitation, as structural panels or other members for automotive or marine applications, building or other structures, or the like.

Figure 2B:
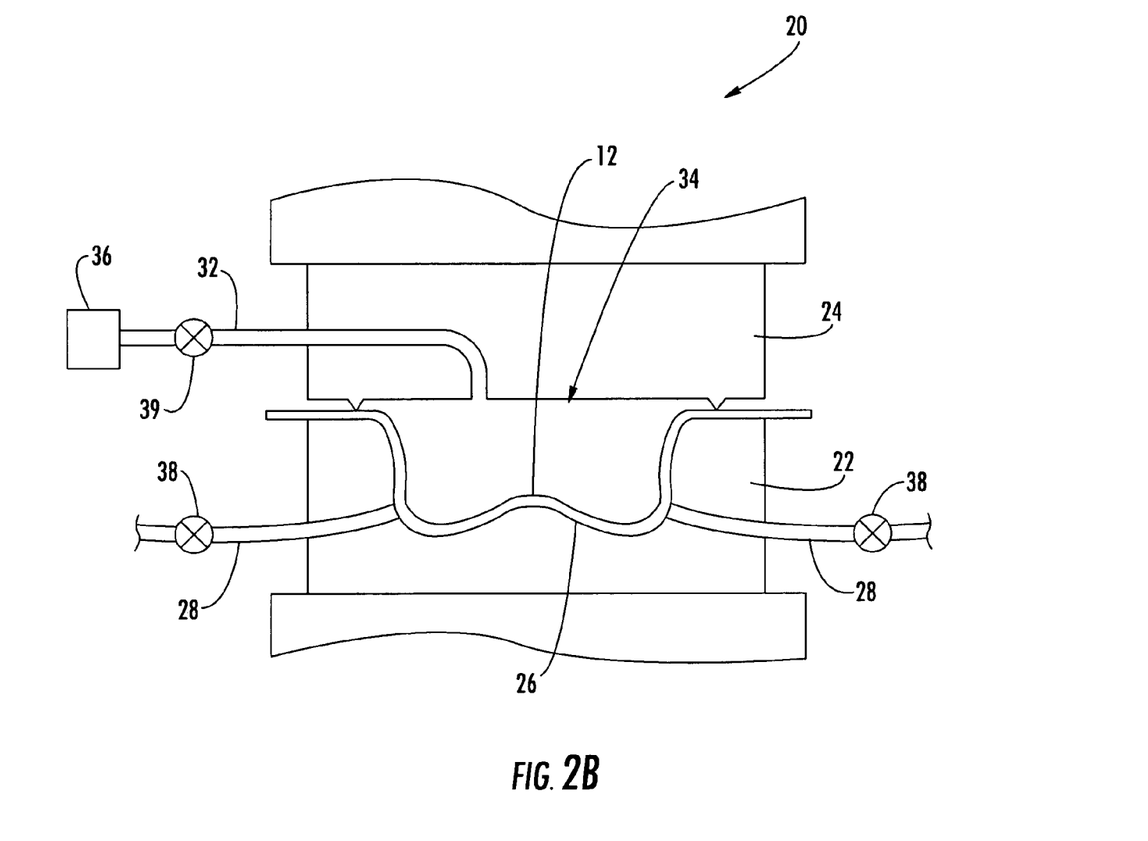
FIG. 2B is a section view in elevation illustrating a structural member disposed in the forming apparatus of FIG. 2A after superplastic forming.

FIG. 2 illustrates an apparatus 20 for superplastically forming the structural member 10 to the desired shape. Superplastic forming generally refers to a process in which a material is subjected to conditions under which the material exhibits superplastic properties such as the capability of the material to develop unusually high tensile elongations and plastic deformation at elevated temperatures, with a reduced tendency toward necking or thinning. The characteristics of superplastic forming are further described in U.S. Pat. No. 3,927,817 to Hamilton, U.S. Pat. No. 4,361,262 to Israeli, and U.S. Pat. No. 5,214,948 to Sanders, each of which is incorporated in its entirety herein by reference, and which generally describe apparatuses in which the methods of the present invention can be performed. As described in the foregoing patents, superplastic forming of structural members can be performed by applying a pressure differential on opposite sides of the blank 12 so that the pressure exerts a sufficient force for forming the blank 12 against a die that defines the desired configuration of the structural member. For example, as illustrated in FIG. 2, the forming apparatus 20 includes opposed dies 22, 24 between which the blank 12 is supported. The first die 22 defines a contour surface 26 corresponding to the desired configuration of the structural member 10. First ports 28 fluidly connect to a first space 30 defined between the first die 22 and the blank 12, and second ports 32 connect to a second space 34 defined between the second die 24 and the structural member 10. A fluid source 36 is connected to the second ports 32 and provides a pressurized fluid to the second space 34. For example, argon gas can be used as the pressurized fluid for superplastically forming titanium. Gas in the first space 30 can be vented through the first ports 28. Valves 38, 39 can be provided for controlling the flow of fluids through the ports 28, 32, respectively. The blank 12 and/or the dies 22, 24 are also heated to a superplastic forming temperature, i.e., a temperature within the superplastic forming temperature range of the blank 12. When subjected to a sufficient pressure differential and heated to the superplastic forming temperature, the blank 12 deforms superplastically and is urged against the contour surface 26 of the first die 22, as shown in FIG. 2B.

Figure 3A:
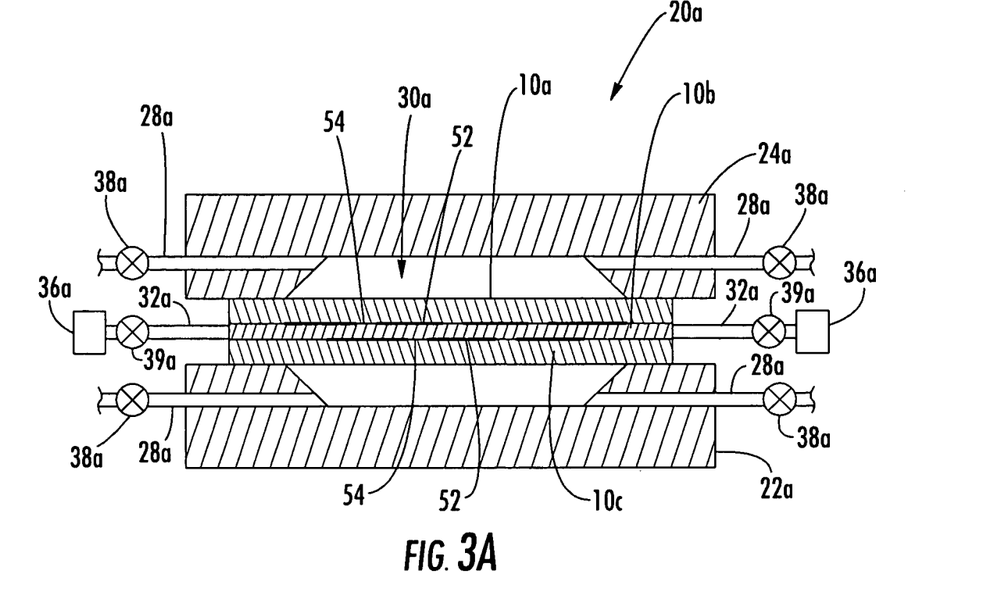
FIG. 3A is a section view illustrating three sheets disposed in an apparatus according to another embodiment of the present invention for diffusion bonding and superplastically forming.
Figure 3B:
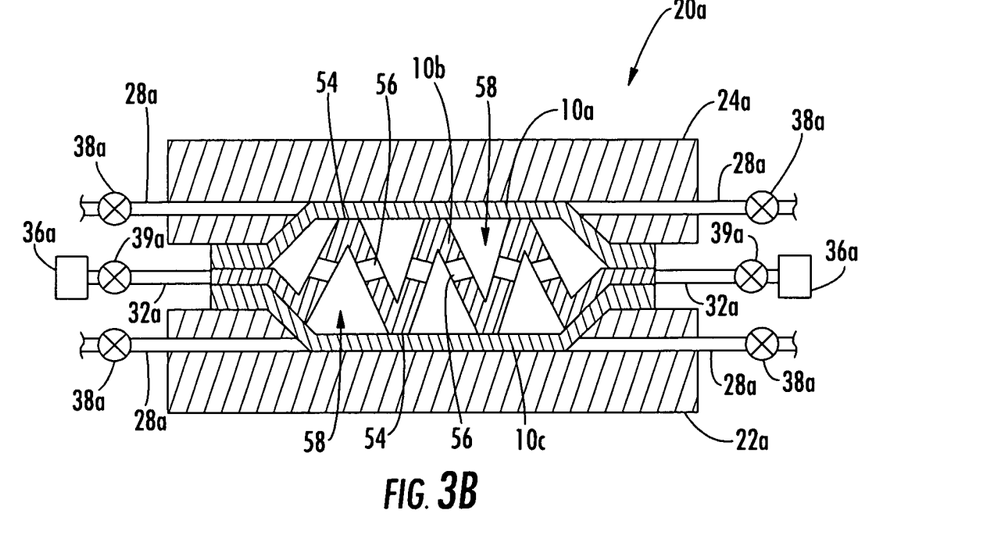
FIG. 3B is a section view illustrating the apparatus and sheets of FIG. 3A after diffusion bonding and superplastic forming.

In other embodiments of the present invention, the blank 12 can be superplastically formed against multiple contour surfaces, and the structural member 10 can be diffusion bonded to define internal spaces that are inflated, such as in the formation of an expanded honeycomb structure. For example, as illustrated in FIGS. 3A and 3B, three sheets 10a, 10b, 10c are provided in an apparatus 20a with opposed dies 22a, 24a that cooperatively define a die cavity 30a therebetween. The sheets 10a, 10b, 10c are provided in a stacked configuration, i.e., as a pack. The periphery of the pack is welded, with tubes 32a provided for injecting pressurized fluid between the sealed spaces between the sheets 10a, 10b, 10c. That is, the tubes 32a can connect one or more fluid sources 36a and valves 39a to the spaces between the sheets 10a, 10b, 10c. A stop-off material 52, which can include yttrium oxide, is provided between the sheets 10a, 10b, 10c in a predetermined pattern as illustrated in FIG. 3A. The sheets 10a, 10b, 10c are heated and the die cavity 30a is pressurized, e.g., by providing a pressurized fluid through ports 28a and valves 38a. The sheets 10a, 10b, 10c are maintained in this compressed and heated condition for a sufficient time for diffusion bonds 54 to form between the adjacent surfaces of the sheets 10a, 10b, 10c. Generally, a longer time is required for diffusion bonding at lower pressures. For example, while diffusion bonding can be performed in 30 minutes or less, diffusion bonding at a pressure of about 400 psi typically takes about 2 hours and diffusion bonding at a pressure of about 250 psi typically takes about 4 hours. The stop-off material 52 generally prevents portions of the sheets 10a, 10b, 10c from bonding, so that the resulting diffusion bonds are formed selectively between the sheets 10a, 10b, 10c. For example, according to one typical diffusion bonding operation, the die cavity 30a is pressurized to a pressure of about 300 psi and the sheets 10a, 10b, 10c are heated to a temperature that is about equal to the superplastic forming temperature, e.g., less than 1500° F. such as between about 1400° F. and 1450° F. or between about 1400° F. and 1425° F.

After the diffusion bonds 54 are formed, the pressurized fluid in the die cavity 30a is released, and a pressurized fluid is injected through the tubes 32a and between the sheets 10a, 10b, 10c to inflate the pack and thereby superplastically form the sheets 10a, 10b, 10c. As illustrated in FIG. 3B, the face sheets 10a, 10c are superplastically formed against the respective dies 22a, 24a, and the middle sheet 10b is superplastically formed to a corrugated configuration as determined by the diffusion bonds 54 between the middle sheet 10b and each of the face sheets 10a, 10c. As shown, apertures 56 can be provided in the middle sheet 10b so that the pressurized fluid is communicated throughout the inflated pack, i.e., between the various cells 58 defined between the sheets 10a, 10b, 10c in the illustrated honeycomb configuration.

Other configurations of structural members can be manufactured by combined SPF/DB operations, including configurations in which fewer or more than three sheets are formed and bonded. Further, in some cases, the superplastic forming can be performed prior to diffusion bonding. It is also noted that while pressurized fluids are used in the foregoing examples for compressing the blank 12 for diffusion bonding and for urging the blank 12 during superplastic forming, a die can alternatively be used to exert the forces necessary for forming or bonding. For example, U.S. Pat. No. 6,612,020 to Sanders, the entirety of which is incorporated herein by reference, describes such a superplastic forming operation in which a die is used to exert the forming force.

The heating for forming and bonding can be provided using various heaters. In some embodiments, the dies 22, 24 can remain relatively unheated while the blank 12 is heated to the superplastic forming temperature by a susceptor in which an electrical current is induced by an induction coil, as described in U.S. Pat. No. 5,683,607 to Gillespie, et al, the entirety of which is incorporated herein by reference.

Figure 4:
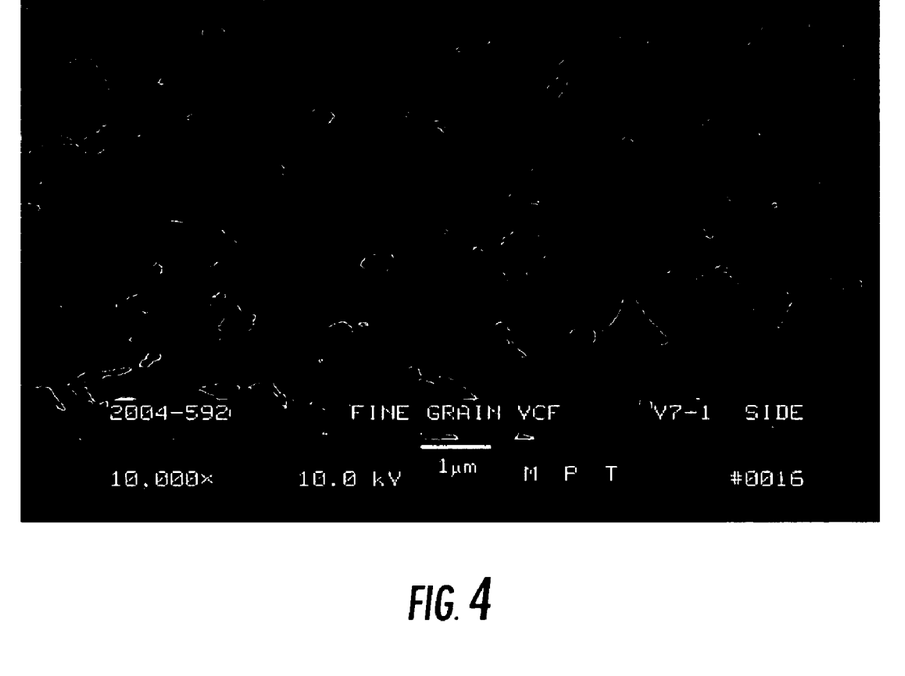
FIG. 4 is an enlarged view illustrating a portion of a structural member having a grain size of about 1 micron.

The blank 12 and, hence, the structural member 10 of the present invention is formed of titanium having a fine grain size. That is, the blank 12 includes titanium, which is typically alloyed with one or more other materials. For example, the structural member 10 can be formed of a titanium alloy that includes aluminum and vanadium such as Ti-6Al-4V. While conventional Ti-6Al-4V is typically a dual phase material with an equiaxed grain size of between about 5 and 8 micron, the grain size of the material of the structural member 10 of the present invention is smaller than about 5 micron. For example, the grain size can be less than 2 micron, such as between about 0.8 and 1.2 micron and, more particularly, about 1 micron. The grain structure of one structural member 10 according to the present invention is illustrated in FIG. 4.

The term "grain size" generally refers to a nominal grain size of the material of the structural member 10 and is not representative of all of the grains thereof. In fact, the structural member 10 typically includes grains of various sizes, some larger and some smaller than the nominal grain size. The nominal grain size for the structural member 10 typically refers to the median grain size of the material of the structural member 10. The term "micron" refers to a length of one micrometer.

Figure 6:
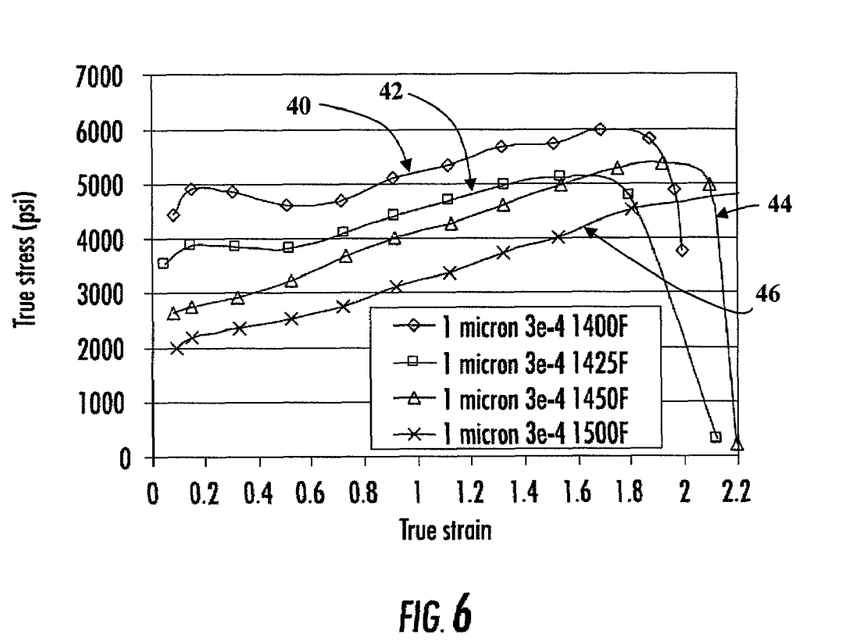
FIG. 6 is a graph illustrating the stress and strain of structural members during superplastic forming according to embodiments of the present invention.

It has been discovered that the fine grain titanium of the present invention can be superplastically formed and diffusion bonded at temperatures less than those of conventional superplastic forming and/or diffusion bonding operations. For example, according to the present invention, the blanks 12 can be superplastically formed and/or diffusion bonded at a temperature of less than about 1500° F. and, in some embodiments of the present invention, at a temperature of between about 1400° F. and 1450° F. or between about 1400° F. and 1425° F. In addition, the superplastic forming can generally be achieved at strain rates that are higher than the strain rates of conventional superplastic forming of titanium members. For example, the blank 12 can be formed at a strain rate of at least about $6 \times 10^{-4}$ per second and, in some cases, at a strain rate of at least about $1 \times 10^{-3}$ per second. Thus, relative to conventional superplastic forming of titanium members, the blanks 12 of the present invention generally can be formed at lower temperatures and faster forming rates. FIG. 6 illustrates the true stress and strain of exemplary structural members 10 during superplastic forming operations performed at four different temperatures according to embodiments of the present invention. In particular, FIG. 6 is illustrative of flat sheet structural members that were superplastically formed under a tensile force at a strain rate of $3 \times 10^{-4}$ per second. In separate trials represented by the lines 40, 42, 44, 46, the structural members 10 were formed at temperatures of 1400° F. (760° C.), 1425° F. (774° C.), 1450° F. (788° C.), and 1500° F. (815° C.), respectively. The true stress represents the force per unit of cross-sectional area of each structural member 10 perpendicular to the primary direction of elongation of the structural member. The true strain represents the elongation per unit length of each structural member 10 in the primary direction of the elongation of the structural member. The true strain is illustrated in FIG. 6 along a logarithmic scale in which the true strain values in the graph are equal to the natural log of a ratio of the elongated size of the structural member to the original size of the structural member. That is, a strain value of 1.1 represents a strain of the structural member elongated by about 200% of its original length and a strain value of 1.8 represents a strain of the structural member elongated by about 500% of its original length. Superplastic forming and diffusion bonding may be performed at temperatures even lower than 1400° F., though greater forming and bonding forces will generally be required.

Figure 7:
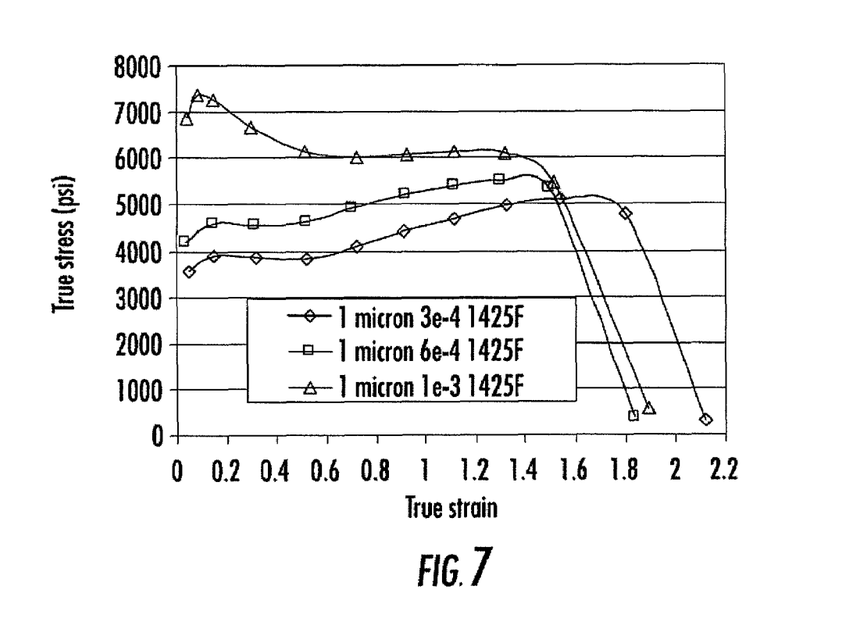
FIG. 7 is a graph illustrating the stress and strain of structural members during superplastic forming according to other embodiments of the present invention.

FIG. 7 illustrates the true stress and strain of exemplary structural members 10 during superplastic forming operations in which the members are strained at rates of $6 \times 10^{-4}$ and $1 \times 10^{-3}$ per second. As illustrated in FIG. 7, the structural members 10 can be superplastically formed at a strain rate greater than $3 \times 10^{-4}$ per second with a true stress of about 6000 psi or less at a true strain of about 1.1 and at a temperature of less than 1500° F. By increasing the strain rate at which the structural members 10 are superplastically formed, the forming time for each structural member 10 can be reduced. That is, at a greater strain rate, each structural member 10 can be formed to a desired configuration in less time, resulting in greater throughput of production and more efficient use of the equipment.

A reduction in the temperature that is required for superplastically forming the blanks 12 can reduce the thermal energy required for heating the blanks 12 for forming and/or bonding. In fact, the reduction in heating can reduce the cost of operating heaters used to heat the blanks during forming and/or bonding, reduce the initial cost of the heaters, and/or extend the useful life of the heaters, particularly since the forming rate is also generally increased.

Figure 5:
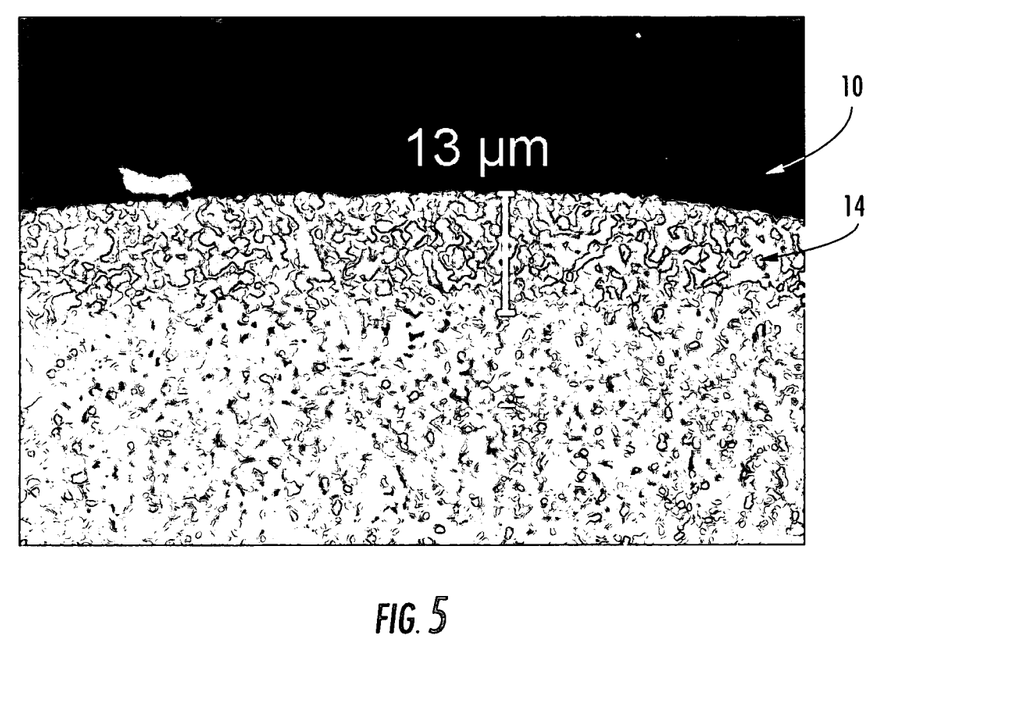
FIG. 5 is an enlarged view illustrating a portion of a structural member having a layer of alpha case oxide formed on one surface thereof.

Moreover, the reduction in the forming temperature and time required for forming can reduce both the formation of oxides and a layer of alpha case on the structural member 10 during forming. In some cases, a layer of about 0.001 inch or less of alpha case is formed on the surface of the structural member 10. For example, FIG. 5 illustrates the surface of the structural member 10 after superplastic forming, on which a layer 14 of about 0.0005 inch (13 micron) of the alpha case oxide was formed. The layer 14 of oxide material formed on the structural member 10 can be removed using various chemical processes, such as by exposing the structural member 10 to a chemical substance to remove the oxide layer 14. For example, the structural member 10 can be pickled by immersing the structural member 10 in a pickling fluid, such as nitric-hydrofluoric, comprising 40% nitric acid and 4% hydrofluoric acid, or otherwise subjecting the structural member 10 to the pickling fluid, to remove the alpha case and oxide layer 14 formed on the structural member 10 during superplastic forming and/or diffusion bonding.

In some cases, the oxide material formed on the structural member 10 during superplastic forming and/or diffusion bonding and subsequently removed by pickling can be less than the amount of material that is formed during conventional superplastic forming and/or diffusion bonding operations and subsequently removed therefrom by chemical etching. For example, the layer 14 of oxide material on the structural member 10 formed during superplastic forming and/or diffusion bonding according to the present invention can be less than about 0.001 inch, and the pickling process can be used to remove less than about 0.001 inch of material from each surface of the structural member 10. If opposite surfaces of the structural member 10 are pickled, the thickness of the structural member 10 can be reduced at a rate that is about twice the rate at which material is removed by pickling from each side of the structural member 10. In some cases, the thickness of the structural member 10 can be reduced by less than about 0.002 inch in order to substantially remove all of the oxide and alpha case formed on the surfaces during superplastic forming and/or diffusion bonding. Thus, the blank 12 can be superplastically formed to a thickness that is only about 0.002 inch greater than a desired thickness of the structural member 10. According to some embodiments of the present invention, the oxide layer 14 can be thinner than 0.001 inch, and the structural member 10 as superplastically formed and/or diffusion bonded can be less than about 0.002 inch greater than the desired final thickness of the structural member 10.

Further, the pickling process can remove the oxide layer 14 from the structural member 10 at a rate that is relatively slow relative to conventional chemical etching processes. For example, the structural member 10 can be dipped in or otherwise subjected to a pickling fluid that removes material from the surface of the structural member 10 at a rate less than about 0.001 inch per 20 minutes, i.e., less than about $5 \times 10^{-5}$ inch per minute. In some cases, a reduced rate at which material is removed from the surfaces of the structural member 10 can increase the uniformity of the rate of removal throughout the surfaces of the structural member 10.

It has also been discovered that articles of the fine grain titanium materials described in the present invention can be diffusion bonded to conventional materials at temperatures less than those typically required for diffusion bonding the same conventional materials. For example, the fine grain blanks 12 or the resulting structural members 10 that are described above can be diffusion bonded to a conventional member formed of a titanium alloy such as Ti-6Al-4V with a grain size of more than 1 micron at a temperature of less than about 1500° F. In some embodiments of the present invention, this diffusion bonding operation can be performed at a temperature of between about 1400° F. and 1450° F. or between about 1400° F. and 1425° F. In one particular embodiment, the diffusion bonding operation is performed by subjecting the fine grain blank 12 (or structural member 10) and the conventional member of Ti-6Al-4V to a temperature of about 1425° F. for about 4 hours, while urging the members together with a pressure of about 300 psi, e.g., in a configuration similar to that of FIG. 3A.

The fine grain titanium members described in the present invention can similarly be diffusion bonded to articles formed of other conventional titanium alloys such as Ti-6-2-4-2 (6% Al, 2% Sn, 4% Zr, 2% Mo, 0.08% Si, remainder Ti). In some cases, the grain size of the conventional titanium articles can be larger than 2 microns, such as between about 5 and 8 microns. Such diffusion bonding of fine grain members with convention members having larger grain sizes can be performed in conjunction with superplastic forming of one or more of the members, and the superplastic forming can be performed before or after the diffusion bonding operation.

Many modifications and other embodiments of the invention set forth herein will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for superplastically forming blanks to produce a first structural member having a predetermined configuration, the method comprising:

providing a first and second blank comprising titanium, wherein the first blank has a grain size of between 0.8 and 1.2 micron and the second blank has a grain size of greater than 2 microns;

heating each blank to within a diffusion bonding temperature range of each blank;

diffusion bonding the first blank to the second blank at a diffusion bonding temperature of less than 1450° F.;

heating the bonded blanks to within a superplastic forming temperature range of the blanks; and superplastically forming the bonded blanks at a forming temperature of less than 1450° F. to produce the structural member having the predetermined configuration, thereby forming a layer of alpha case oxide on the structural member; and pickling the structural member following superplastically forming the bonded blanks to remove the alpha case oxide layer.

2. A method according to claim 1 wherein said providing step comprises providing the blanks formed of Ti-6A1-4V.

3. A method according to claim 1 wherein said superplastically forming step comprises forming less than about 0.001 inch alpha case oxide layer on each surface of the structural member.

4. A method according to claim 1, wherein said pickling step comprises subjecting the structural member to a pickling fluid and thereby removing material from surfaces of the structural member at a rate less than about $5 \times 10^{-5}$ inch per minute.

5. A method according to claim 1, wherein said pickling step comprises removing less than about 0.001 inch from each surface of the structural member.

6. A method according to claim 1 wherein said superplastically forming step comprises forming the blanks to a thickness less than about 0.002 inch greater than a desired thickness of the structural member.

7. A method according to claim 1 wherein said superplastically forming step comprises superplastically forming the structural member at a temperature between 1400° F. and 1450° F.

8. A method according to claim 1 wherein said superplastically forming step comprises superplastically forming the blanks at a strain rate of at least about $6 \times 10^{-4}$ per second.

9. A method according to claim 1 wherein said superplastically forming step comprises superplastically forming the blanks at a strain rate of at least about $1 \times 10^{-3}$ per second.

10. A method according to claim 1 wherein the second blank has a grain size of between 5 and 8 microns.

11. A method for superplastically forming blanks to produce a structural member having a predetermined configuration, the method comprising:

providing first and second blanks formed of Ti-6A1-4V and having a grain size of between 0.8 and 1.2 micron;

heating each blank to within a diffusion bonding temperature range of each blank;

diffusion bonding the first blank to the second blank at a diffusion bonding temperature of less than 1450° F.;

heating the bonded blanks to within a superplastic forming temperature range of the blanks;

superplastically forming the bonded blanks at a forming temperature of less than 1450° F. to produce the structural member having the predetermined configuration, thereby forming a layer of alpha case oxide of less than about 0.001 inch thickness on each surface of the structural member; and pickling the structural member following superplastically forming the bonded blanks to remove the alpha case oxide layer.

12. A method according to claim 11 wherein said providing step comprises providing the blanks having a grain size of about 1 micron.

13. A method according to claim 11 wherein said pickling step comprises subjecting the structural member to a pickling fluid and thereby removing material from surfaces of the structural member at a rate less than about $5 \times 10^{-5}$ inch per minute.

14. A method according to claim 11 wherein said pickling step comprises removing less than about 0.001 inch from each surface of the structural member.

15. A method according to claim 11 wherein said superplastically forming step comprises forming the blanks to a thickness less than about 0.002 inch greater than a desired thickness of the structural member.

16. A method according to claim 11 wherein said superplastically forming step comprises superplastically forming the structural member at a temperature of about 1425° F.

17. A method according to claim 11 wherein said superplastically forming step comprises superplastically forming the blanks at a strain rate of at least about $6 \times 10^{-4}$ per second.

18. A method according to claim 11 wherein said superplastically forming step comprises superplastically forming the blanks at a strain rate of at least about $1 \times 10^{-3}$ per second.

19. A method for superplastically forming blanks to produce a structural member having a predetermined configuration, the method comprising:

providing first and second blanks comprising titanium, wherein the first blank has a grain size of between about 0.8 and 1.2 micron, and wherein the second blank has a grain size of greater than 2 microns;

heating each blank to within a diffusion bonding temperature range of each blank;

diffusion bonding the first blank to the second blank at a diffusion bonding temperature of less than 1450° F.;

heating the bonded blanks to within a superplastic forming temperature range of the blanks;

superplastically forming the bonded blanks at a forming temperature of less than 1450° F. and at a strain rate of at least about $6 \times 10^{-4}$ per second to produce the structural member having the predetermined configuration, thereby forming a layer of alpha case oxide on each surface of the structural member; and pickling the structural member following superplastically forming the bonded blanks to remove the alpha case oxide layer.

20. A method according to claim 19, wherein pickling the structural member comprises subjecting the structural member to a pickling fluid and thereby removing material from surfaces of the structural member at a rate less than about $5 \times 10^{-5}$ inch per minute.

21. A method according to claim 20 wherein said subjecting step comprises removing less than about 0.001 inch from each surface of the structural member.

22. A method according to claim 19 wherein said superplastically forming step comprises forming the blanks to a thickness less than about 0.002 inch greater than a desired thickness of the structural member.

23. A method according to claim 19 wherein said superplastically forming step comprises superplastically forming the structural member at a temperature of about 1425° F.

24. A method according to claim 19 wherein said superplastically forming step comprises superplastically forming the blanks at a strain rate of at least about $1 \times 10^{-3}$ per second.

25. A method according to claim 19 wherein the second blank has a grain size of between 5 and 8 microns.

* * * * *

UNITED STATES PATENT AND TRADEMARK OFFICE
CERTIFICATE OF CORRECTION

PATENT NO. : 7,533,794 B2 Page 1 of 1
APPLICATION NO. : 10/813892
DATED : May 19, 2009
INVENTOR(S) : Comley et al.

It is certified that error appears in the above-identified patent and that said Letters Patent is hereby corrected as shown below:

On the Title Page

Item (73) Assignee: should read

--The Boeing Company, Chicago, IL (US)--

Signed and Sealed this

Seventh Day of July, 2009

JOHN DOLL
*Acting Director of the United States Patent and Trademark Office*